United States Patent [19]
Wallner et al.

[11] Patent Number: 5,503,429
[45] Date of Patent: Apr. 2, 1996

[54] VEHICLE OCCUPANT RESTRAINT APPARATUS AND METHOD OF ASSEMBLY

[75] Inventors: John P. Wallner, Rochester; Ernst M. Faigle, Imlay City, both of Mich.

[73] Assignee: TRW Vehicle Safety Systems Inc., Lyndhurst, Ohio

[21] Appl. No.: 299,696

[22] Filed: Sep. 1, 1994

[51] Int. Cl.$^6$ .................................................. B60R 21/20
[52] U.S. Cl. ................................. 280/743.1; 280/728.1
[58] Field of Search ............................ 280/728.1, 729, 280/732, 743.1

[56] References Cited

U.S. PATENT DOCUMENTS

| | | | |
|---|---|---|---|
| 3,580,603 | 5/1971 | Chute | 280/743.1 |
| 3,748,477 | 7/1973 | Wulbrecht | 280/743.1 |
| 3,792,873 | 2/1974 | Bucher et al. | 280/743.1 |
| 3,799,575 | 3/1974 | Kurze et al. | 280/743.1 |
| 4,153,273 | 5/1979 | Risko | 280/740 |
| 4,169,613 | 10/1979 | Barnett | 280/732 |
| 4,191,392 | 3/1980 | Barnett | 280/732 |
| 4,262,931 | 4/1981 | Strasser et al. | 280/729 |
| 4,286,954 | 9/1981 | McArthur et al. | 493/244 |
| 4,360,223 | 11/1982 | Kirchoff | 280/743.1 X |
| 4,944,527 | 7/1990 | Bishop et al. | 280/743.1 |
| 4,964,654 | 10/1990 | Bishop et al. | 280/743.1 |
| 5,022,675 | 7/1991 | Zelenak, Jr. et al. | 280/743.1 |
| 5,062,664 | 11/1991 | Bishop et al. | 280/743.1 |
| 5,069,480 | 12/1991 | Good | 280/743.1 |
| 5,129,675 | 7/1992 | Wang | 280/743.1 |
| 5,149,130 | 9/1992 | Wooley et al. | 280/743.1 |
| 5,172,933 | 12/1992 | Strasser | 280/740 |
| 5,240,282 | 8/1993 | Wehner et al. | 280/743.1 X |
| 5,257,815 | 11/1993 | Bachelder et al. | 280/728.1 |
| 5,333,903 | 8/1994 | Eyrainer et al. | 280/743.1 |

FOREIGN PATENT DOCUMENTS

0558240A1  9/1993  European Pat. Off. .

Primary Examiner—Margaret A. Facarino
Assistant Examiner—Christopher Ellis
Attorney, Agent, or Firm—Tarolli, Sundheim & Covell

[57] ABSTRACT

A vehicle occupant restraint apparatus (10) includes an inflator (16), a structure (18) defining a chamber (134) in which the inflator (16) is receivable, and an inflatable vehicle occupant restraint (12). The restraint (12) has a compartment (110) in which the inflator (16) and the structure (18) defining the chamber (134) are receivable. The restraint (12) further has an opening (104) through which the inflator (16) and the structure (18) are movable into the compartment (110) from a location outside of the restraint (12).

13 Claims, 4 Drawing Sheets

VEHICLE OCCUPANT RESTRAINT APPARATUS AND METHOD OF ASSEMBLY

FIELD OF THE INVENTION

The present invention relates to an apparatus for restraining an occupant of a vehicle. The present invention particularly relates to an apparatus comprising an air bag module, and to a method of assembling the apparatus.

BACKGROUND OF THE INVENTION

An inflatable vehicle occupant restraint, such as an air bag, is inflated upon the occurrence of a vehicle collision. Inflation fluid is directed to flow from a source of inflation fluid into the air bag to inflate the air bag. The inflation fluid inflates the air bag from a stored, folded condition to an inflated condition in which the air bag extends into the vehicle occupant compartment. When the air bag is inflated into the vehicle occupant compartment, it restrains an occupant of the vehicle from forcefully striking parts of the vehicle.

The air bag is stored in an air bag module which is mounted in the vehicle. In addition to the air bag, the air bag module contains an inflator which comprises the source of inflation fluid for inflating the air bag. Typically, an air bag module also includes a reaction canister which contains the air bag and the inflator. The reaction canister is mounted in the vehicle, such as in the instrument panel of the vehicle, and is covered by a deployment door which opens upon inflation of the air bag.

SUMMARY OF THE INVENTION

In accordance with the present invention, a vehicle occupant restraint apparatus comprises an inflator means, a structure defining a chamber in which the inflator means is receivable, and an inflatable vehicle occupant restraint. The inflator means comprises a source of inflation fluid for inflating the restraint, and has at least one fluid outlet opening. The structure defining the chamber has means for directing the inflation fluid to flow outward from the chamber.

The inflatable vehicle occupant restraint has a compartment in which the chamber defining structure and the inflator means are receivable. The restraint further has means for defining an opening through which the chamber defining structure and the inflator means are movable into the compartment from a location outside of the restraint.

In a preferred embodiment of the present invention, the inflatable vehicle occupant restraint is an air bag, and each of the foregoing parts of the apparatus is a part of an air bag module. The air bag module further includes a reaction canister in which the air bag and the other parts of the apparatus are housed and supported in a vehicle.

In the preferred embodiment, the inflator means comprises a cylindrical inflator body, and the structure defining the chamber comprises a cylindrical retainer tube. The retainer tube is moved longitudinally into the compartment inside the air bag through the opening in the air bag. When the retainer tube has been received in the compartment inside the air bag, the air bag and the retainer tube are moved into the reaction canister through a deployment opening at the front of the reaction canister. The cylindrical inflator body is then moved longitudinally into the reaction canister through an opening at the side of the reaction canister, and is thus moved longitudinally through the opening in the air bag and coaxially into the chamber in the retainer tube. A fastening means is then used to secure the inflator, the retainer tube and the air bag in the reaction canister. Importantly, the air bag module constructed in accordance with the present invention, and the method of assembling the air bag module in accordance with the present invention, are simplified in comparison with the prior art because the retainer tube and the cylindrical inflator body are both received through the same opening in the air bag.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
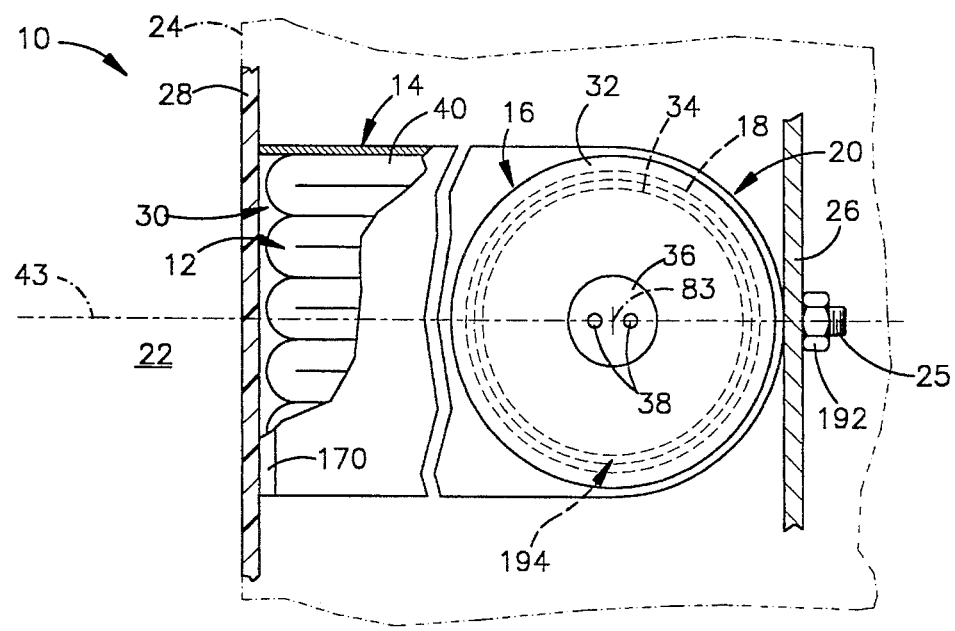
FIG. 1 is a side view of a vehicle occupant restraint apparatus comprising a first embodiment of the present invention.

A vehicle occupant restraint apparatus 10 comprising a first preferred embodiment of the present invention is shown in FIG. 1. The apparatus 10 includes an inflatable vehicle occupant restraint 12 which is commonly referred to as an air bag. The air bag 12 is housed in a reaction canister 14 in a stored, folded condition. The apparatus 10 further includes an inflator 16 and a retainer 18. The inflator 16 and the retainer 18 also are housed in the reaction canister 14.

The air bag 12, the reaction canister 14, the inflator 16 and the retainer 18 are parts of an air bag module 20. The module 20 is mounted in a vehicle at a location adjacent to the vehicle occupant compartment 22, such as in the instrument panel 24 at the passenger side of the vehicle. A plurality of mounting bolts 25 project from the inner end of the module 20 (i.e., the end farthest from the vehicle occupant compartment 22) and support the module 20 on a portion 26 of the instrument panel 24. The mounting bolts 25 could alternatively support the module 20 on a cross-vehicle beam or on any other suitable vehicle part. A deployment door 28 on the instrument panel 24 extends over a deployment opening 30 in the reaction canister 14, and conceals the air bag 12 and the reaction canister 14 from the vehicle occupant compartment 22. The module 20 could alternatively include a deployment door separate from the instrument panel 24.

The inflator 16 comprises a source of inflation fluid for inflating the air bag 12 and may contain, for example, an ignitable gas generating material and/or a quantity of stored inflation fluid, as known in the art. A circular flange portion 32 of the inflator 16 is located outside of the reaction canister 14. A cylindrical body portion 34 of the inflator 16 extends axially from the flange portion 32 into the reaction canister 14. The inflator 16 further includes a squib 36, and is actuated upon the passage of electric current between a pair of electrical contact pins 38 protruding axially from the squib 36. Such a squib is known in the art. The retainer 18 comprises a tubular structure which surrounds the cylindrical body 34 of the inflator 16 at a location spaced radially from the cylindrical body 34.

When the vehicle experiences a predetermined amount of deceleration, such as occurs in a collision, electric current is passed between the electrical contact pins 38 in the inflator 16 in a known manner. The inflator 16 is then actuated and provides inflation fluid which is directed radially outward from the cylindrical body 34. The inflation fluid is directed through the retainer 18 and into the air bag 12 to inflate the air bag 12 from the stored, folded condition shown in FIG. 1 to an inflated condition, as shown partially in FIG. 2.

Figure 2:
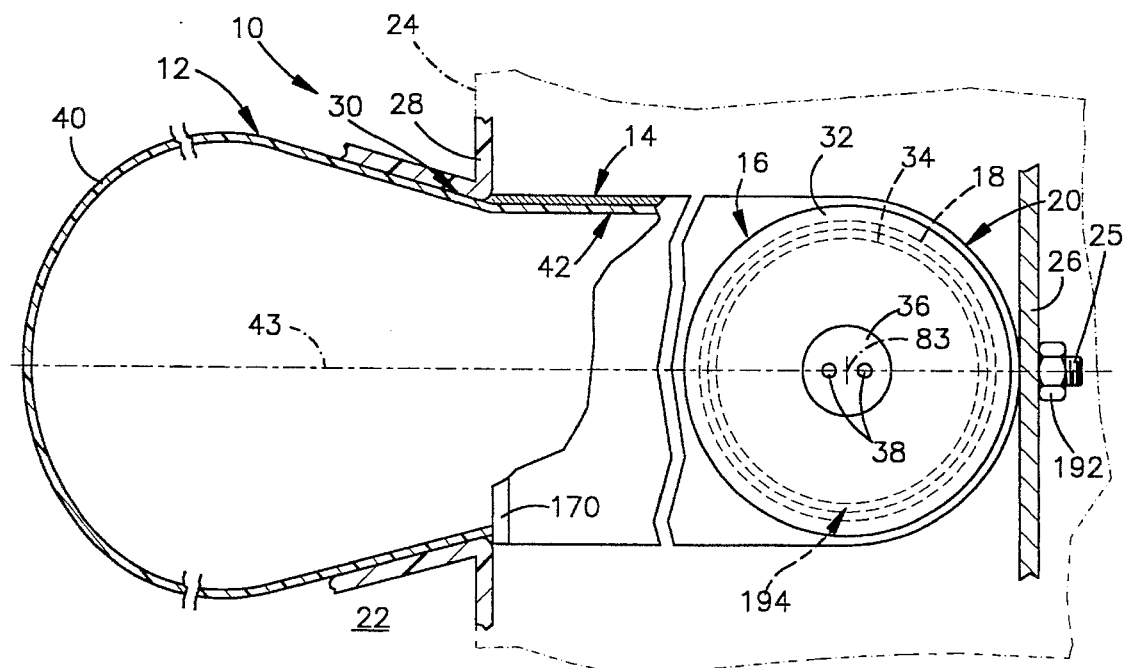
FIG. 2 is a view showing the apparatus of FIG. 1 in an actuated condition.

As the inflation fluid begins to inflate the air bag 12, it moves the air bag 12 forcefully outward against the deployment door 28 at the deployment opening 30 in the reaction canister 14. The deployment door 28 ruptures under the stress induced by the pressure of the inflation fluid in the air bag 12, and thus releases the air bag 12 for movement outward from the deployment opening 30 and into the vehicle occupant compartment 22 as indicated in FIG. 2. A stress riser (not shown) of known construction, such a thinned or notched section of material, is preferably included in the deployment door 28 so as to cause the deployment door 28 to rupture and move out of the path of the inflating air bag 12 as the inflating air bag 12 emerges from the reaction canister 14. The air bag 12 is thus inflated into the vehicle occupant compartment 22 to restrain an occupant of the vehicle from forcefully striking the instrument panel 24 or other parts of the vehicle.

Figure 3:
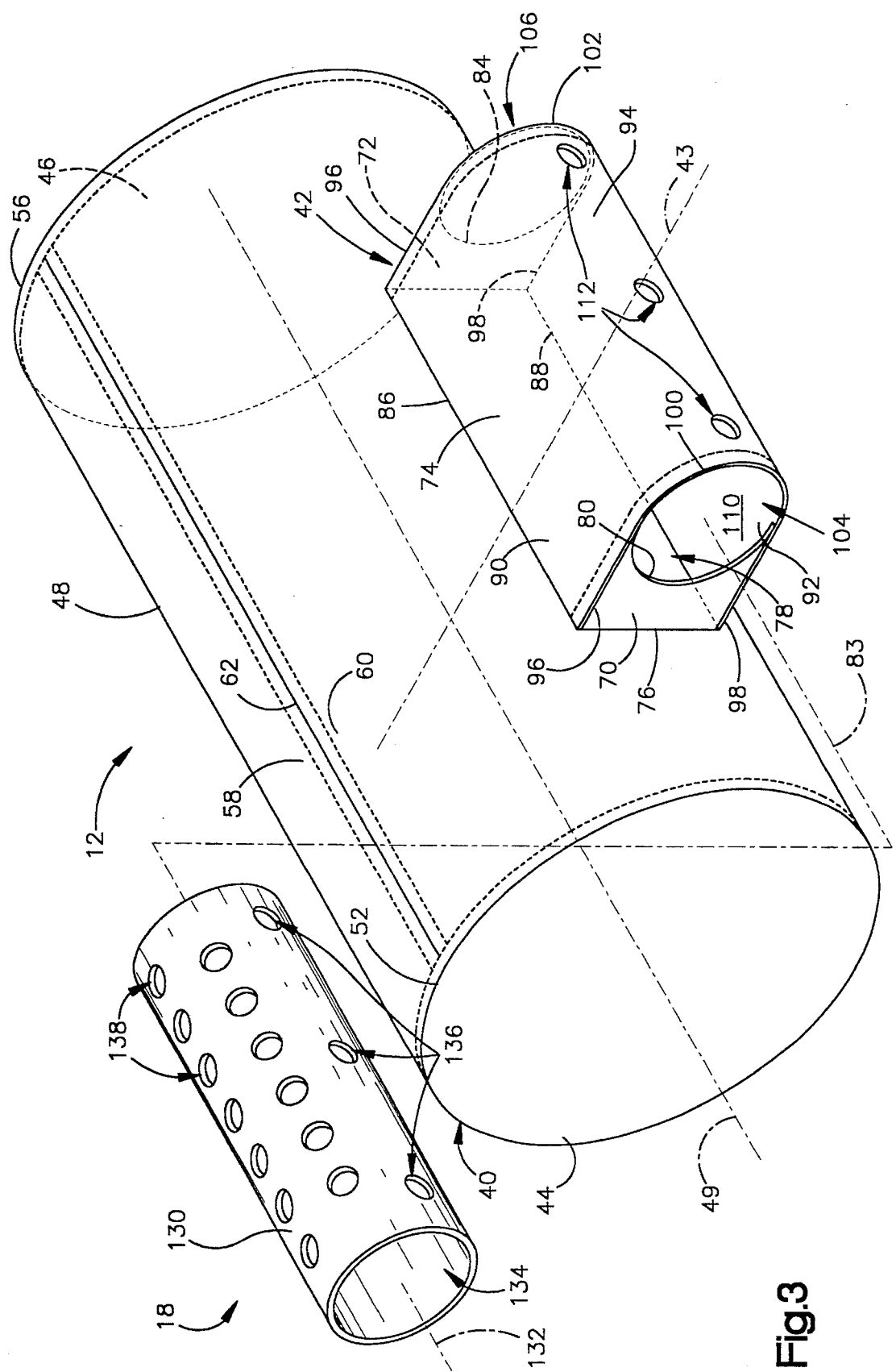
FIG. 3 is an exploded perspective view of parts of the apparatus of FIGS. 1 and 2.

The air bag 12 is shown in FIG. 3 in the unfolded, inflated condition. As shown fully in FIG. 3, the air bag 12 has an outer portion 40 and an inner portion 42. At least a major part of the inner portion 42 of the air bag 12 remains in the reaction canister 14 (FIG. 2) when the air bag 12 is inflated. The outer portion 40 of the air bag 12 moves outward from the reaction canister 14 and into the vehicle occupant compartment 22 (FIG. 2) when the air bag 12 is inflated. When the outer portion 40 thus moves outward from the reaction canister 14, it moves in a direction extending outward along a first axis 43 of the air bag 12.

The outer portion 40 of the air bag 12 includes a plurality of panels that preferably comprise separate pieces of fabric. The pieces of fabric may be formed of any suitable material known in the art. The panels include a first outer side panel 44, a second outer side panel 46, and a main outer panel 48. The panels 44, 46 and/or 48 may include a single ply or multiple plies of fabric material, and their shapes may vary as desired. As illustrated in the drawings by way of example, each of the outer side panels 44 and 46 comprises a circular piece of fabric. The main outer panel 48 comprises a rectangular piece of fabric, and extends longitudinally between the outer side panels 44 and 46. When the air bag 12 is in the unfolded, inflated condition of FIG. 3, the first and second outer side panels 44 and 46 are centered on a second axis 49 of the air bag 12 which is perpendicular to the first axis 43. The main outer panel 48 then has a generally cylindrical, tubular configuration centered on the second axis 49.

The first outer side panel 44 is fastened to the main outer panel 48 at a seam 52. The seam 52 extends circumferentially entirely around the periphery of the first outer side panel 44. The second outer side panel 46 is likewise fastened to the main outer panel 48 at a seam 56 which extends circumferentially entirely around the periphery of the second outer side panel 46. As noted above, the main outer panel 48 comprises a rectangular piece of fabric. The rectangular piece of fabric has opposite longitudinal edge portions 58 and 60. When the air bag 12 is being assembled, the opposite longitudinal edge portions 58 and 60 of the rectangular piece are brought together at a longitudinally extending seam 62, and are fastened to each other entirely along their lengths at the seam 62. The seams 52, 56, and 62, as well as any finished edges of the air bag 12, may be formed as known in the art. However, the air bag 12 may include one or more seams formed in accordance with the invention set forth in copending U.S. patent application Ser. No. 08/259,629, filed Jun. 14, 1994, entitled "Inflatable Vehicle Occupant Restraint," and assigned to TRW Vehicle Safety Systems Inc.

The inner portion 42 of the air bag 12 also includes a plurality of panels that may comprise single plies or multiple plies of fabric material. Such panels include a first inner side panel 70, a second inner side panel 72, and a main inner panel 74. All three of the inner panels 70, 72 and 74 are fastened to the main outer panel 48 at a seam 76. The seam 76 extends entirely around the periphery of a rectangular opening 78 at the rear of the main outer pane 48.

The first inner side panel 70 is generally planar, and is generally perpendicular to the second axis 49 of the air bag 12. An arcuate edge 80 of the first inner side panel 70 has a semi-circular contour centered on a third axis 83 of the air bag 12. The third axis 83 is parallel to the second axis 49, and is thus perpendicular to the first axis 43. The second inner side panel 72 also is generally planar and generally perpendicular to the second axis 49, and also has an arcuate edge 84 with a semi-circular contour centered on the third axis 83.

The main inner panel 74 comprises a rectangular piece of fabric which, as shown in FIG. 3, is assembled into the air bag 12 in a U-shaped configuration. Specifically, the main inner panel 74 has upper and lower opposite ends 86 and 88 fastened to the main outer panel 48 at the seam 76, and extends over the rectangular opening 78 in a U-shaped loop between its opposite ends 86 and 88. The main inner panel 74 thus has upper and lower portions 90 and 92 that are generally planar, and further has a rear portion 94 that extends in an arc between the upper and lower portions 90 and 92.

The upper and lower portions 90 and 92 of the main inner panel 74 are generally parallel to each other, and extend to the rear from the main outer panel 48. The upper portion 90 is fastened to the first and second inner side panels 70 and 72 at a pair of upper seams 96. The lower portion 92 is similarly fastened to the first and second inner side panels 70 and 72 at a pair of lower seams 98.

The rear portion 94 of the main inner panel 74 has a semi-circular contour centered on the third axis 83. A first arcuate edge 100 of the rear portion 94 is diametrically opposed to the arcuate edge 80 of the first inner side panel 70. A second arcuate edge 102 of the rear portion 94 is diametrically opposed to the arcuate edge 84 of the second inner side panel 72. The opposed arcuate edges 80 and 100 together define a first circular opening 104 which is centered on the third axis 83. In the same manner, the opposed arcuate edges 84 and 102 together define a second circular opening 106 which also is centered on the third axis 83. The second circular opening 106 is preferably the same diameter as the first circular opening 104.

As further shown in FIG. 3, the panels 70, 72 and 74 at the inner portion 42 of the air bag 12 define a compartment 110 inside the air bag 12. The compartment 110 is a channel-shaped space extending longitudinally along the third axis 83, and has a length which is equal to the axial distance across the inner portion 42 of the air bag 12 between the inner side panels 70 and 72. The opposite ends of the compartment 110 are open at the circular openings 104 and 106. The compartment 110 thus communicates with the exterior of the air bag 12 through the circular openings 104 and 106. A front side of the compartment 110 is coextensive with the rectangular opening 78. The compartment 110 thus communicates with the interior of the outer portion 40 of the air bag 12 through the rectangular opening 78.

As shown in the drawings, the main inner panel 74 has apertures 112 for receiving the mounting bolts 25 (FIG. 1). However, the main inner panel 74 is otherwise fully continuous along the length of the compartment 110 between the inner side panels 70 and 72, and is fully continuous around the compartment 110 in a loop between the opposite ends 86 and 88 of the main inner panel 74. Accordingly, the upper portion 90 of the main inner panel 74 defines, and fully closes, an upper side of the compartment. The lower portion 92 likewise defines and fully closes a lower side of the compartment 110. The rear portion 94 defines a rear side of the compartment 110 which is closed except at the locations of the apertures 112.

As shown in greater detail in FIG. 3, the retainer 18 comprises an elongated cylindrical retainer tube 130 with a longitudinal central axis 132. The retainer tube 130 defines an elongated cylindrical chamber 134 centered on the axis 132. A plurality of apertures 136 for receiving the mounting bolts 25 extend radially through the retainer tube 130. A plurality of fluid flow openings 138 also extend radially through the retainer tube 130. The fluid flow openings 138 are arranged in a staggered array which extends along nearly the entire length of the retainer tube 130, and which further extends around the entire circumference of the retainer tube 130. The retainer tube 130 could alternatively have differently shaped fluid flow openings, such as slots, which could be arranged in a different array, or could alternatively comprise a tubular wire screen or other structure which defines a chamber and which has means for providing fluid flow communication between the chamber and the exterior of the structure.

As indicated by the broken line shown in FIG. 3, the retainer tube 130 is movable coaxially through the first circular opening 104 at the inner portion 42 of the air bag 12, and is thus movable longitudinally into the compartment 110 in the air bag 12. Since the second circular opening 106 is the same diameter as the first circular opening 104, the retainer tube 130 could alternatively be moved longitudinally into the compartment 110 in the opposite direction coaxially through the second circular opening 106. The length of the retainer tube 130 is preferably equal to the length of the compartment 110. The outer diameter of the retainer tube 130 is preferably equal to, or just slightly less than, the diameter of the circular openings 104 and 106. The retainer tube 130 is thus receivable in the compartment 110 in the position shown in FIG. 4.

When the retainer tube 130 has been received in the compartment 110 in the air bag 12 in the foregoing manner, the mounting bolts 25 are received through the apertures 136 and 112 in the retainer tube 130 and the air bag 12, respectively. The mounting bolts 25 preferably fit closely in the apertures 136 in the retainer tube 130 so as to remain in place during handling of the apparatus. The outer portion 40 of the air bag 12 is folded into an appropriate configuration, such as the one shown in FIG. 4. The air bag 12 then has the configuration in which it is to be stored in the reaction canister 14 in the uninflated condition of FIG. 1.

Figure 4:
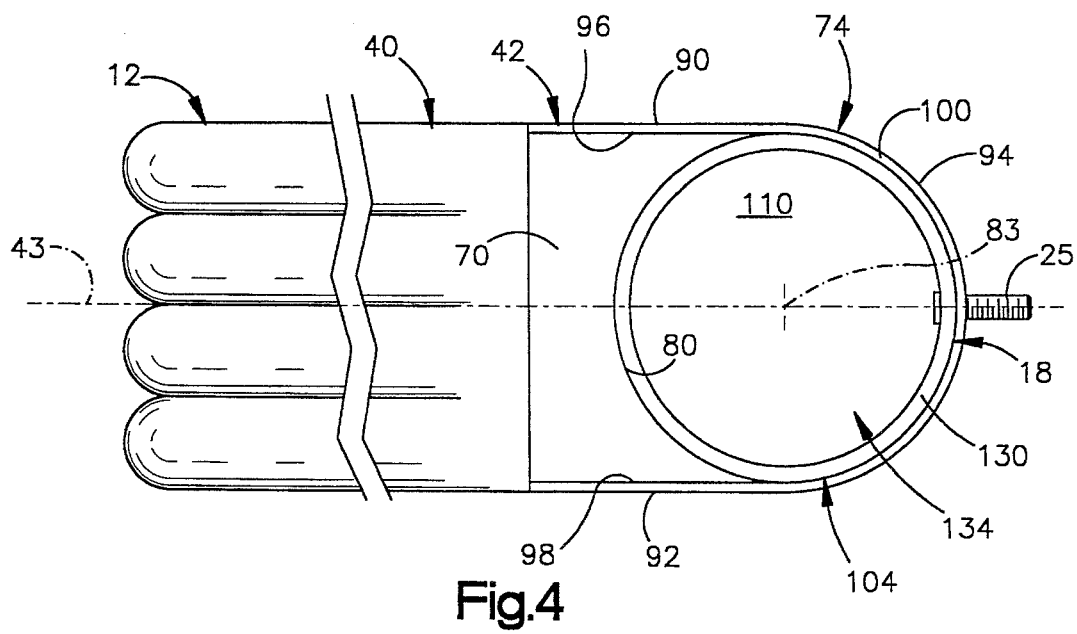
FIG. 4 is a side view of parts of the apparatus of FIGS. 1 and 2.
Figure 5:
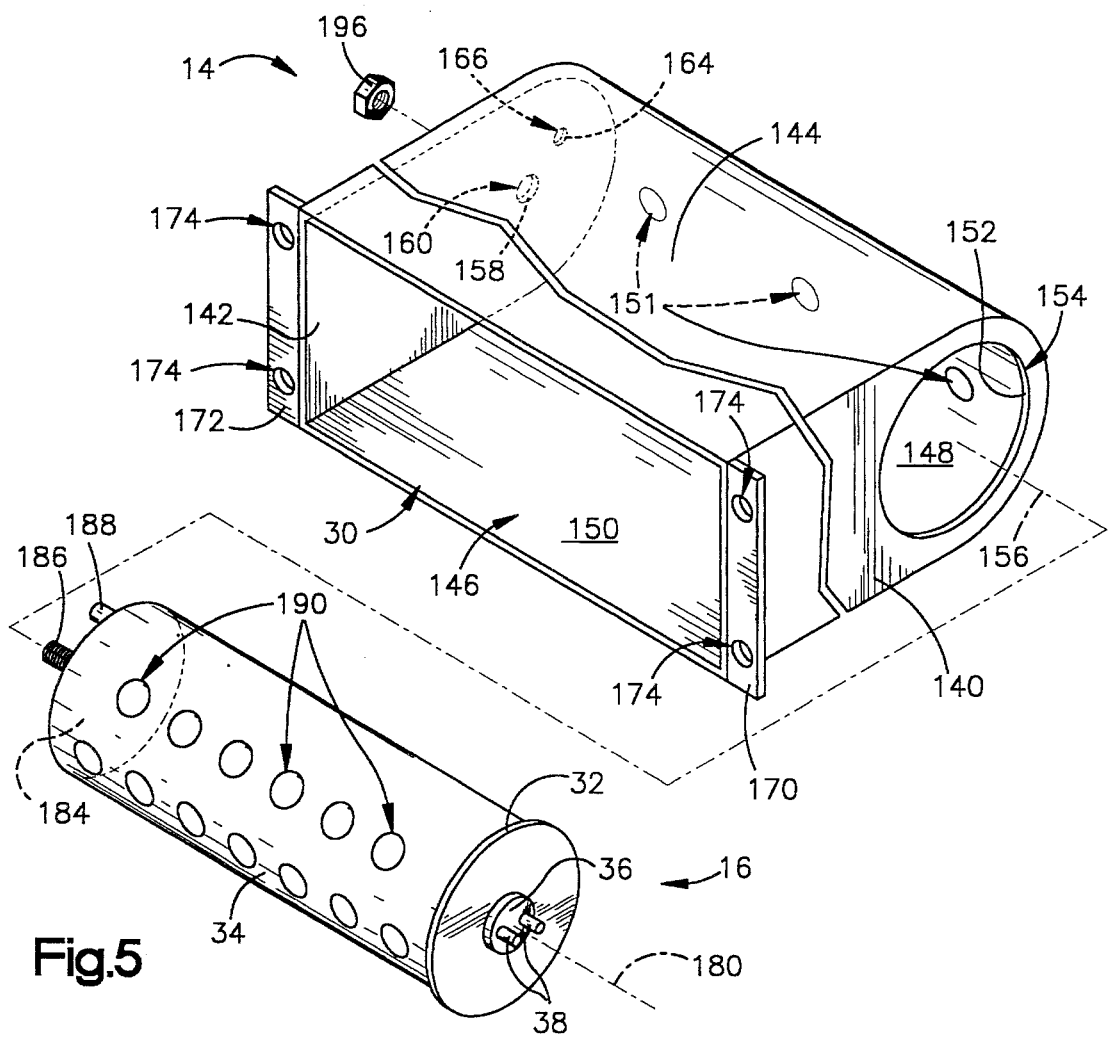
FIG. 5 is an exploded perspective view of parts of the apparatus of FIGS. 1 and 2.

The reaction canister 14 is shown in greater detail in FIG. 5. As shown in FIG. 5, the reaction canister 14 has first and second opposite side walls 140 and 142. A U-shaped main wall 144 of the reaction canister 14 extends between the side walls 140 and 142. The walls 140, 142 and 144 of the reaction canister 14 define a chamber 146 inside the reaction canister 14. The chamber 146 has generally distinct inner and outer compartments 148 and 150. The outer compartment 150 is a rectangular space with a shape and volume closely matching the shape and volume of the folded outer portion 40 of the air bag 12 (FIG. 4). The inner compartment 148 is a channel-shaped space with a shape and volume closely matching the shape and volume of the inner end portion 42 of the air bag 12 (FIG. 4).

The main wall 144 of the reaction canister 14 has a plurality of apertures 151 for receiving the mounting bolts 25. The first side wall 140 of the reaction canister 14 has an annular edge surface 152 defining a circular opening 154 centered on an axis 156. The diameter of the circular opening 154 is preferably equal to, or just slightly greater than, the outer diameter of the cylindrical inflator body 34. The second side wall 142 of the reaction canister 14 has an annular edge surface 158 defining a smaller circular opening 160 which also is centered on the axis 156. Another annular inner edge surface 164 of the second side wall 142 defines a circular alignment opening 166 which is smaller than the circular opening 160.

The reaction canister 14 further includes a pair of mounting flanges 170 and 172 which project from the first and second side walls 140 and 142, respectively, at locations adjacent to the deployment opening 30. Each of the mounting flanges 170 and 172 has a pair of apertures 174 which receive additional mounting bolts or other fasteners (not shown) for mounting the reaction canister 14 in the vehicle in the position shown in FIGS. 1 and 2. Alternatively, the reaction canister 14 could have different parts for mounting the reaction canister 14 in the vehicle, as known in the art.

The inflator 16 also is shown in greater detail in FIG. 5. As shown in FIG. 5, the cylindrical body 34 of the inflator 16 has a longitudinal central axis 180, and a circular end wall 184 is located at the end of the cylindrical body 34 opposite the flange 32. A mounting bolt 186 projects axially from the end wall 184 at a location centered on the axis 180. An alignment pin 188 projects axially from the end wall 184 at a location spaced radially from the mounting bolt 186. The cylindrical body 34 further has a plurality of fluid outlet openings 190. The fluid outlet openings 190 are arranged in a staggered array which extends along nearly the entire length of the cylindrical body 34, and which further extends partly around the circumference of the cylindrical body 34. Moreover, the outer diameter of the cylindrical body 34 is slightly less than the inner diameter of the retainer tube 130 (FIG. 3).

Like the retainer 18 and the reaction canister 14, the inflator 16 may comprise an alternative structure which differs somewhat from that described above. Such alternative inflator structures are known in the art and include, for example, a cylindrical pressure vessel with an outlet manifold at one end.

Figure 6:
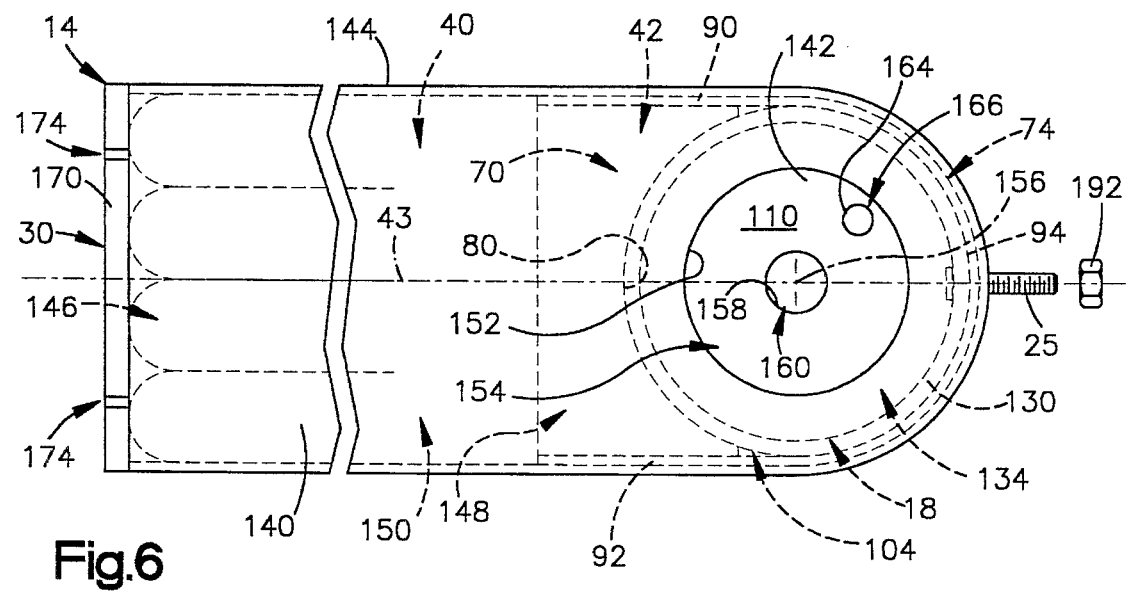
FIG. 6 is a side view of parts of the apparatus of FIGS. 1 and 2.

When the retainer 18 has been received in the compartment 110 in the air bag 12 as shown in FIG. 4, and when the air bag 12 has been arranged in the configuration shown in FIG. 4, the air bag 12 and the retainer 18 are moved together into the chamber 146 in the reaction canister 14 through the deployment opening 30. As shown in FIG. 6, the folded outer portion 40 of the air bag 12 is closely received in the rectangular outer compartment 150 in the reaction canister 14. The inner portion 42 of the air bag 12, which contains the retainer 18, is closely received in the channel-shaped inner compartment 148 in the reaction canister 14. The mounting bolts 25 are received through the apertures 151 in the reaction canister 14 and preferably fit closely in the apertures 151 so as to hold the retainer 18 in place during handling of the apparatus. Additionally, threaded nuts 192 or the like could be received on the mounting bolts 25 at this stage of the assembly process. When thus secured in the reaction canister 14, the retainer 18 retains the inner portion 42 of the air bag 12 in the reaction canister 14. Moreover, the retainer tube 130 and the circular openings 104 and 106 in the air bag 12, which are coaxial with each other, are aligned with the circular opening 154 on the axis 156 of the reaction canister 14.

When the air bag 12 and the retainer 18 have been received in the reaction canister 14 in the foregoing manner, the inflator 16 is received in an installed position in the reaction canister 14. Specifically, the inflator 14 is moved longitudinally into the channel-shaped inner compartment 148 in the reaction canister 14 along the axis 156, with the cylindrical body 34 of the inflator 14 being closely received through the circular opening 154 in the reaction canister 14. The inflator 16 is thus moved longitudinally into the compartment 110 in the air bag 12 through the first circular opening 104 in the air bag 12, and is simultaneously moved longitudinally into the chamber 134 in the retainer tube 130. When the end wall 184 of the inflator 16 reaches the second wall 142 of the reaction canister 14, the mounting bolt 186 on the inflator 16 is received through the circular opening 160 in the second end wall 142. The alignment pin 188 is then received through the alignment opening 166. The alignment pin 188 and the alignment opening 166 are arranged so as to support the inflator 16 in a position in which the fluid outlet openings 190 on the cylindrical inflator body 34 face forward in the reaction canister 14 from the inner compartment 148 toward the outer compartment 150. The fluid outlet openings 190 thus face forward in the compartment 110 in the air bag 12 from the inner portion 42 of the air bag 12 toward the outer portion 40 of the air bag 12.

As noted above, the outer diameter of the cylindrical inflator body 34 is slightly less than the inner diameter of the retainer tube 130. As a result, a cylindrical fluid flow space 194 is defined in the chamber 134 radially between the inflator body 34 and the retainer tube 130, as shown in FIGS. 1 and 2. The retainer 18 thus retains the inner portion 42 of the air bag 12 in the reaction canister 14 in a position spaced radially from the cylindrical inflator body 34.

A threaded nut 196 or the like (FIG. 5) is received on the mounting bolt 186 so as to fasten the inflator 16 in the installed position in which it is received in the reaction canister 14. Tightening of the nut 196 against the second side wall 142 of the reaction canister 14 causes the flange 32 at the opposite end of the inflator 16 to be pressed firmly against the first side wall 140 of the reaction canister 14, as shown in FIGS. 1 and 2. The air bag module 30 is thus assembled separately from the vehicle instrument panel 20. When the module 30 is installed in the vehicle, the nuts 192 on the mounting bolts 25 (FIG. 6) can be removed and replaced for installation of the module 30 in the manner shown in FIGS. 1 and 2.

Figure 7:
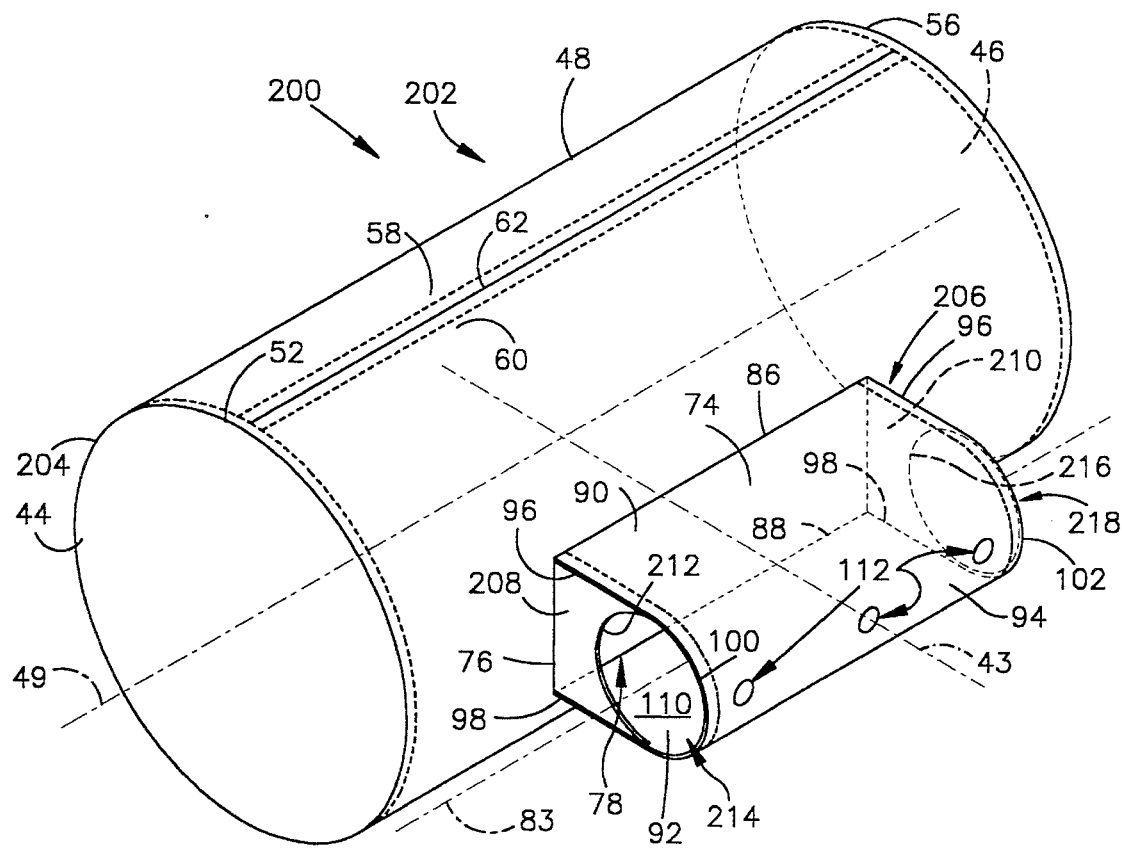
FIG. 7 is a perspective of a part of a vehicle occupant restraint apparatus comprising a second embodiment of the present invention.

A vehicle occupant restraint apparatus 200 comprising a second embodiment of the present invention is shown partially in FIG. 7. The apparatus 200 includes an air bag 202. The air bag 202 has an outer portion 204 and an inner portion 206. As indicated by the same reference numbers used in FIGS. 3 and 7, the outer portion 204 of the air bag 202 has parts that are the same as corresponding parts of the outer portion 40 of the air bag 12 described above. The inner portion 206 of the air bag 202 likewise has parts that are the same as corresponding parts of the inner portion 42 of the air bag 12. Such parts define a third axis 83 of the air bag 202 which is perpendicular to a first axis 43, and include a main inner panel 74 which extends in a loop around a channel-shaped compartment 110 inside the air bag 202.

The inner portion 206 of the air bag 202 has other parts that differ somewhat from corresponding parts of the inner portion 42 of the air bag 12. Specifically, the inner portion 206 of the air bag 202 has first and second inner side panels 208 and 210 which differ from the first and second inner side panels 70 and 72. Unlike the first inner side panel 70, which has a semi-circular arcuate edge 80 (FIG. 3), the first inner side panel 208 has a fully circular arcuate edge 212. The fully circular arcuate edge 212 of the first inner side panel 208 defines a first circular opening 214 which is centered on the third axis 83 of the air bag 202. The second inner side panel 210 similarly has a fully circular arcuate edge 216 which defines a second circular opening 218 centered on the third axis 83. Like the circular openings 104 and 106 at the inner portion 42 of the air bag 12 described above, the circular openings 214 and 218 at the inner portion 206 of the air bag 202 have diameters equal to the outer diameter of a tubular retainer (not shown) like the retainer 18 shown in FIG. 3. Each of the circular openings 214 and 218 is thus designed to enable longitudinal movement of the retainer into the compartment 110 in the air bag 202 through either of the circular openings 214 and 218. When the retainer has thus been received in the compartment 110, the inner portion 206 of the air bag 202 is received in a reaction canister, and receives an inflator in the compartment 110 through the first circular opening 214, in the same manner as described above with reference to the inner portion 42 of the air bag 12.

From the above description of the invention, those skilled in the art will perceive improvements, changes and modifications. For example, the invention has been described with reference to air bags having generally cylindrical portions that are inflated outward into a vehicle occupant compartment at the passenger side of the vehicle, but the invention is equally applicable to air bags or other inflatable vehicle occupant restraints that are used at different locations in a vehicle and that have different shapes. The particular locations at which panel portions of an air bag are fastened to each other also may differ from those described above.

Additionally, it may be desirable to construct and assemble an air bag module in which a retainer or similar structure is moved into a compartment in an air bag after, rather than before, the air bag is received in a reaction canister. Alternatively, it may be desirable to move an inflator into a retainer in a compartment in an air bag before, rather than after, the retainer and the air bag are received in a reaction canister. An air bag constructed in accordance with the present invention can accommodate such variations in the sequence of steps taken in the assembly of an air bag module. Such improvements, changes and modifications within the skill of the art are intended to be covered by the appended claims.

Having described the invention, the following is claimed:

1. Apparatus comprising:

inflator means for providing inflation fluid, said inflator means having at least one fluid outlet opening;

a structure defining a chamber in which said inflator means is receivable, said structure having means for directing said inflation fluid to flow outward from said chamber;

an inflatable vehicle occupant restraint, said restraint having a compartment inside said restraint in which said structure and said inflator means are receivable, said restraint further having means for defining an opening through which said structure and said inflator means are movable into said compartment from a location outside of said restraint; and means for supporting said inflator means in an installed position in said chamber when said structure defining said chamber is located in said compartment inside said restraint, said inflator means comprising a cylindrical inflator body having a central axis, said cylindrical inflator body being movable axially through said opening from a location outside of said restraint to said installed position;

said supporting means comprising a reaction canister having a chamber in which said restraint, said structure, and said cylindrical inflator body are receivable when said structure is located in said compartment inside said restraint;

said reaction canister having an opening which is aligned with said opening in said restraint when said restraint and said structure are located in said chamber in said reaction canister, said cylindrical inflator body being movable axially through said aligned openings from a location outside of said reaction canister to said installed position.

2. Apparatus comprising:

inflator means for providing inflation fluid, said inflator means having at least one fluid outlet opening;

a structure defining a chamber in which said inflator means is receivable, said structure having means for directing said inflation fluid to flow outward from said chamber; and an inflatable vehicle occupant restraint, said restraint having a compartment inside said restraint in which said structure and said inflator means are receivable, said restraint further having means for defining an opening through which said structure and said inflator means are movable into said compartment from a location outside of said restraint;

said compartment inside said restraint being defined at least in part by a panel portion of said restraint extending in a loop around said compartment;

said restraint having first and second opposite side panel portions which are spaced from each other and which define opposite ends of said compartment, said opening being defined in part by said first side panel portion and in part by said panel portion extending in a loop around said compartment.

3. Apparatus comprising:

inflator means for providing inflation fluid, said inflator means having at least one fluid outlet opening;

a structure defining a chamber in which said inflator means is receivable, said structure having means for directing said inflation fluid to flow outward from said chamber; and an inflatable vehicle occupant restraint, said restraint including an inner fabric panel means defining a compartment inside said restraint in which said structure and said inflator means are receivable, said restraint further including an outer fabric panel means which moves in an outward direction to restrain a vehicle occupant when said restraint is inflated;

said inner fabric panel means further defining an opening through which said structure and said inflator means are movable into said compartment from a location outside of said restraint in a sideways direction perpendicular to said outward direction;

said inner fabric panel means including a main panel portion which extends in a loop around said compartment, said inner fabric panel means further including first and second opposite side panel portions which are spaced from each other in said sideways direction, said opening being defined in part by said first side panel portion and in part by said main panel portion.

4. Apparatus as defined in claim 3 wherein said second side panel portion and said main panel portion together define an alternative opening through which said structure is movable into said compartment from a location outside of said restraint in an alternative sideways direction opposite to said sideways direction.

5. A method of assembling a vehicle occupant restraint apparatus, said method comprising the steps of:

moving a tubular structure into a compartment inside an inflatable vehicle occupant restraint through an opening in said restraint;

moving said restraint into a reaction canister through a first opening in said reaction canister when said tubular structure is located in said compartment; and moving a cylindrical inflator structure into said tubular structure in said compartment through said opening in said restraint, said inflator structure being moved into said tubular structure through a second opening in said reaction canister which is aligned with said opening in said restraint.

6. A method as defined in claim 5 further comprising the step of fastening said inflator structure in a position in which said inflator structure is aligned axially with said opening in said restraint and with said second opening in said reaction canister.

7. Apparatus comprising:

inflator means for providing inflation fluid, said inflator means comprising a cylindrical inflator body having a longitudinal central axis;

a structure defining a chamber in which said inflator means is receivable, said structure having means for directing said inflation fluid to flow outward from said chamber;

an inflatable vehicle occupant restraint having a compartment in which said structure and said inflator means are receivable, said restraint further having means for defining an opening through which said structure and said inflator means are both movable into said compartment from a location outside of said restraint; and means for supporting said cylindrical inflator body in an installed position in said chamber, said cylindrical inflator body being movable axially through said opening in said restraint from a location outside of said restraint to said installed position.

8. Apparatus as defined in claim 7 wherein said supporting means comprises a reaction canister having a chamber in which said restraint, said structure, and said cylindrical inflator body are receivable when said structure is located in said compartment inside said restraint.

9. Apparatus as defined in claim 7 wherein said compartment is defined in part by a panel portion of said restraint which extends in a loop around said compartment, and in part by first and second opposite side panel portions of said restraint which are spaced from each other and which define opposite ends of said compartment, said opening being defined entirely by said first side panel portion.

10. Apparatus comprising:

inflator means for providing inflation fluid, said inflator means having at least one fluid outlet opening;

a structure defining a chamber in which said inflator means is receivable, said structure having means for directing said inflation fluid to flow outward from said chamber; and an inflatable vehicle occupant restraint including outer fabric panel means which moves in an outward direction to restrain a vehicle occupant when said restraint is inflated;

said restraint further including inner fabric panel means for defining a compartment inside said restraint in which said structure and said inflator means are receivable, said inner fabric panel means having a portion extending in a loop around said compartment to define a closed inner end of said compartment;

said inner fabric panel means further defining an opening through which said structure and said inflator means are both movable into said compartment from a location outside of said restraint in a sideways direction perpendicular to said outward direction.

11. Apparatus as defined in claim 10 wherein said inner fabric panel means further has first and second opposite side panel portions which are spaced from each other in said sideways direction, said opening being defined in part by said first side panel portion and in part by said main panel portion.

12. Apparatus as defined in claim 10 wherein said inner fabric panel means further has first and second opposite side panel portions which are spaced from each other in said sideways direction, said opening being defined entirely by said first side panel portion.

13. A method of assembling a vehicle occupant restraint apparatus, said method comprising the steps of:

moving a tubular structure into a compartment inside an inflatable vehicle occupant restraint through an opening in said restraint;

moving a cylindrical inflator structure into said tubular structure in said compartment through said opening in said restraint; and fastening said inflator structure in an installed position in which said inflator structure is aligned axially with said opening in said restraint.

* * * * *